Oct. 18, 1938.   W. F. DORIOT   2,133,659
AUTOMATIC ANTISKID MECHANISM
Filed Dec. 2, 1937
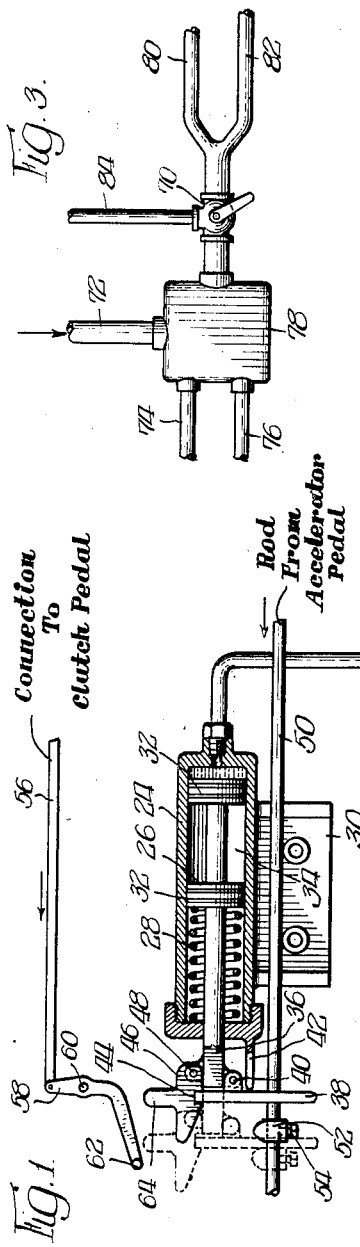
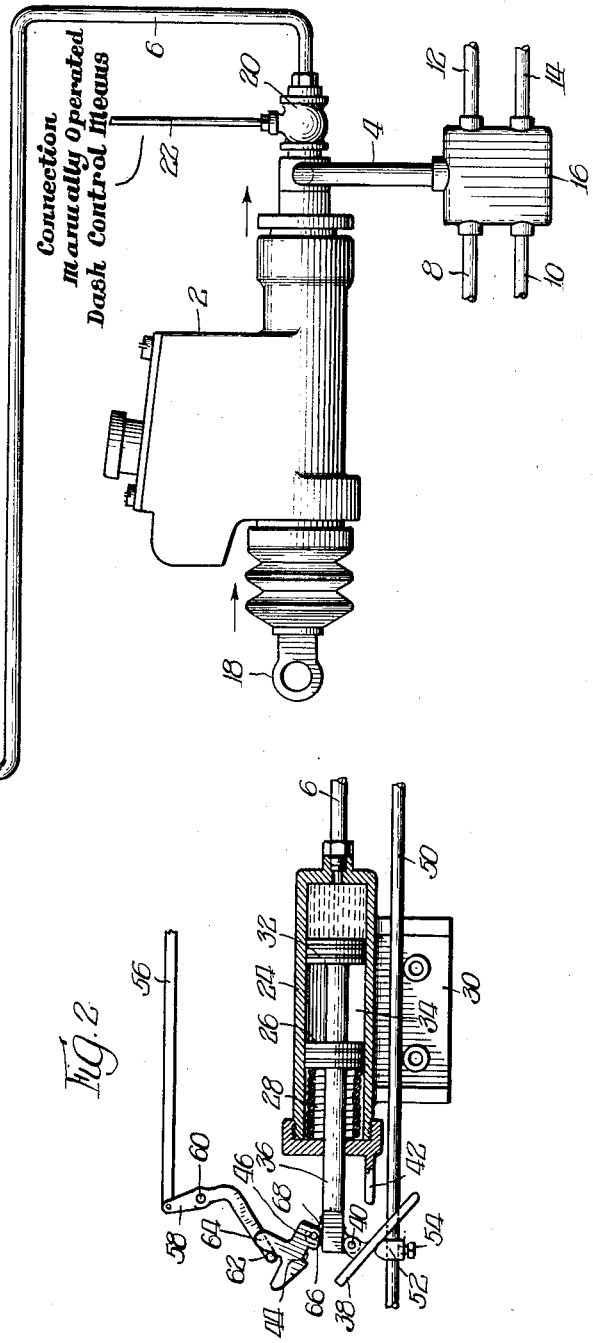
Inventor:
William F. Doriot,
By Richard Spencer
atty.

Patented Oct. 18, 1938

2,133,659

UNITED STATES PATENT OFFICE 2,133,659

AUTOMATIC ANTISKID MECHANISM

William F. Doriot, Chicago, Ill.

Application December 2, 1937, Serial No. 177,699

7 Claims. (Cl. 192—.01)

This invention relates to a plural control mechanism for the brakes, accelerator and clutch of automobiles and the like. It particularly relates to a mechanism for automatically and simultaneously applying the brakes and accelerator of automobiles and is adapted to prevent skidding on wet and slippery highways.

It is well known that many accidents occur through inability of the driver to properly control his car on wet and slippery streets and highways. Skidding, which is the principal cause of such accidents, may be largely attributed to locking of the wheels of the vehicle when the brakes are applied.

It is an object of my invention to provide an automatic mechanism by which skidding may be substantially avoided. A further object is the provision of a new and improved type of plural control mechanism. Other objects will appear hereinafter.

In accomplishing these objects I provide a plural control mechanism which automatically and simultaneously causes the engine of an automobile or similar vehicle to be accelerated a certain predetermined amount when the brake pedal is depressed in the normal way. This invention is based upon the discovery that skidding on wet and slippery streets or on ice, snow and the like may be substantially avoided by accelerating the engine a substantial and predetermined amount at the same time that the brakes are applied. Since acceleration and braking are two opposite functions, it would not ordinarily be expected that they could be used simultaneously to obtain a useful and desirable result, yet I have found such to be the case.

In its broader aspects my invention contemplates a mechanism adapted for use with the ordinary type of automobile containing in combination an engine, means for accelerating said engine, a braking system and means associated with the braking system and the acceleration means for simultaneously and automatically accelerating the engine a predetermined amount when the brakes are applied.

More specifically the mechanism also preferably includes means associated with the clutch and the braking and acceleration means for decelerating the engine when the clutch is released at or about the time the vehicle is brought to a stop and while the brakes are still applied. The purpose of this additional mechanism is to avoid racing the motor when the car has been brought to a stop and while the brakes are still applied.

The invention will be further illustrated by the following description in conjunction with the accompanying drawing in which:

Fig. 1 represents diagrammatically and partly in section a plural control mechanism of the type above described for an automobile equipped with hydraulic brakes;

Fig. 2 represents the position of a portion of said mechanism as it would normally appear when the automobile has been brought to a stop and the clutch released while the brakes are still applied;

Fig. 3 represents an optional arrangement by means of which the front wheel brakes are rendered inactive.

Referring to Fig. 1, the apparatus shown comprises the usual type of master cylinder and piston indicated by numeral 2. The details of this type of cylinder and piston arrangement are well known to those skilled in the art and, therefore, are not believed to require any further description. The cylinder is a reservoir for oil or other fluid such as is usually employed in a four-wheel hydraulic braking system. Oil is also contained in the conduits 4, 6, 8, 10, 12 and 14 and in the common supply union 16. Conduit 4 connects the master cylinder and piston arrangement to common union 16. Conduits 8, 10, 12 and 14 lead to the brakes of a four-wheel braking system. As pressure is applied from the brake pedal through that portion of the apparatus illustrated by numeral 18, the piston within the cylinder arrangement 2 is moved in the direction of the arrows causing pressure on the oil through conduits 4, 8, 10, 12 and 14 with consequent operation of the brakes in the usual manner.

According to my invention a valve 20 is provided in conduit 6 which may be operated from the dashboard by a mechanical element 22 shown with parts broken away. Valve 20 may be the usual type of two-way valve serving to open and close conduit 6 when manually operated from the dashboard or from some other portion of the automobile.

Conduit 6 is connected to a cylinder 24 provided with a piston 26 and compression springs 28. This cylinder may be fastened to the frame or other part of the automobile by any suitable means 30. The piston 26 may be provided with washers 32 made from leather, polymerized chloro-butadiene 1, 3 or other synthetic rubber or any other type of material resistant to the action of the fluid used in the hydraulic braking system. If desired, the annular space 34 may be filled with a packing material. In general the construction of the piston 26 and the materials used may be similar to the construction and materials of the piston ordinarily employed in the master cylinder 2 of the usual hydraulic braking system.

The piston rod 36 projects through cylinder 24 and has connected thereto an end plate 38 adapted to move around a fulcrum 40 and in contact at its lower side adjacent the cylinder 24 with a stop 42 which may be fixed to and be a part of cylinder 24. The upper portion 44 of end plate 38 is held in place by a lock or latching arrangement 46 adapted to pivot around a fulcrum 48. Both the end plate 38 and the latching arrangement 46 are carried by the end of the piston rod 36. Rod 50 is one of the accelerator rods running between the accelerator pedal, not shown, and the carburetor of the automobile. The car is ordinarily accelerated by moving rod 50 in the direction of the arrow. The accelerator pedal and rods are provided with the usual spring mechanism to restore them to place when the operator's foot is removed. Rod 50 is provided with an adjustable stop 52 which may be set at any desired point in order to obtain any desired predetermined degree of acceleration. The setting may be accomplished by means of a set screw 54 or any other suitable means.

Rod 56, shown with parts broken away, is operated by the clutch pedal which is provided with the usual spring mechanism so that the rod 56 automatically resumes its normal position when the operator's foot is removed. When the clutch is disengaged rod 56 moves in the direction of the arrow and at the same time causes the trip arrangement 58 to move counterclockwise around pivot 60. As trip 58 moves counterclockwise around pivot 60 the lower portion 62 thereof strikes projection 64 which forms a part of the latch element 46 and causes latch element 46 to move clockwise around pivot 48 thus releasing end plate 38 and causing it to move counterclockwise around pivot 40.

The operation of the above described plural control mechanism takes place as follows: The normal position is shown by the heavy lines in Fig. 1 and in this position the clutch is engaged, the brakes are off and the engine is idling. The plural control mechanism is set in operation by opening valve 20 by means of rod 22 connected to the dashboard, or by any other suitable means. Conduit 6 is filled with a fluid similar to, or the same as the fluid employed in the hydraulic braking system and contained in the master cylinder 2. It will thus be apparent that any pressure on the brake pedal conveyed to the piston within the master cylinder 2 through that portion 18 and in the direction of the arrows will cause a corresponding pressure to be exerted on the braking system through conduits 4, 8, 10, 12 and 14 and on the plural control mechanism through conduit 6. As this pressure is exerted piston 26 in cylinder 24 is moved forward against the pressure of springs 28 and carries with it end plate 38 and latching arrangement 46. As it advances it strikes against stop 52 and causes accelerator rod 50 to move forward in the direction of the arrow, thus automatically and simultaneously accelerating the car at the time the brakes are applied. The advanced position of the stop 52, end plate 38, piston 36 and latching arrangement 46 is shown by the dotted lines in Fig. 1. As the brakes are applied the automobile comes to a stop and locking of the wheels and skidding is prevented by the simultaneous acceleration. At this time, however, it is customary for the driver to release his clutch in order to prevent choking of the motor and to prepare for shifting gears. When the clutch is released, inasmuch as the engine has been accelerated a predetermined amount, racing of the motor would normally ensue if the brakes are fully applied. According to my invention this is prevented by the trip arrangement illustrated in Fig. 1 as follows: As the clutch pedal is depressed, rod 56 moves in the direction of the arrow causing the portion 62 of the pivot element 56 to strike projection 64 and trip latch 46 by raising it and moving it in a clockwise direction. Inasmuch as end plate 38 is in an advanced position and is no longer against stop 42, and furthermore, is under pressure in a counterclockwise direction due to the normal accelerator pull on rod 50, end plate 38 moves and permits rod 50 to return to its normal position. This is illustrated in Fig. 2. As shown in Fig. 2, the operator still has his foot on the brake and hence the piston rod 36 is still in an advanced position with springs 28 compressed. When the operator releases his foot from the brake, springs 28 return to their normal position, causing piston 26 and piston rod 36 to return to their normal positions. Since end plate 38 and latch arrangement 46 are carried on piston rod 36, they are likewise retracted and as such retraction takes place, end plate 38 strikes against stop 42 and assumes an upright position. At the same time latch arrangement 46 falls and assumes its normal position locking in place end portion 44 of end plate 38. As illustrated by the drawing, the movement of latch arrangement 46 may be restricted by flat portions 66 and 68 adjacent pivot 48 and coacting with piston 36. When the clutch is engaged again rod 56 assumes its normal position, as shown in Fig. 1. It will be noted that the clutch trip mechanism is only operative when the piston and accelerator rods are in an advanced position, as shown by the dotted lines in Fig. 1.

It will be understood that valve 20 is provided to connect and disconnect the entire control mechanism and is allowed to remain open continuously during any time in which the mechanism may be used. In other words, it is not necessary to open and close valve 20 for each braking operation, and if desired, it may be allowed to remain open all winter. The same would be true for any other means employed to accomplish a similar purpose.

In some instances it may be desirable to release the front wheel brakes when the plural control mechanism, previously described, is in operation. This may be accomplished as shown in Fig. 3 by providing a three-way valve 70 instead of the two-way valve 20, shown in Fig. 1. In Fig. 3 conduit 72 takes the place of conduit 4, conduits 74 and 76 take the place of conduits 8 and 10 leading to the rear brakes, respectively. The common union 78 takes the place of union 16 and conduits 80 and 82 take the place of conduits 12 and 14 leading to the front wheel brakes. Conduit 84 takes the place of conduit 6. Conduit 72 is connected directly to the master cylinder. Conduit 84 is connected to the plural control mechanism. When valve 70 is turned to the operative position for the plural control mechanism, the front wheel brakes are rendered inoperative, and all braking action takes place with the rear wheel brakes. The operation of the plural control mechanism is otherwise the same. Since acceleration in the ordinary car is provided through the rear wheels it is immaterial from the standpoint of preventing skidding whether the front wheel brakes are allowed to rotate freely. The only effect is to reduce some of the braking area.

The invention provides an entirely automatic mechanism for controlling automobiles and for preventing skidding on wet and slippery streets and highways. Plural control mechanisms have heretofore been suggested in order to reduce the number of pedals required. For instance, several of such mechanisms are adapted to control both the engine throttle and brakes by the selective operation of a single pedal. According to one such mechanism, pushing the pedal toward the floor board operates the brake, while rocking the pedal sideways operates the throttle, but this requires two distinctly different types of movements of the operator's foot, and even if simultaneous operation could be secured, it is in no sense automatic. Furthermore, insofar as I am aware, no one has heretofore provided an automatic plural control mechanism particularly adapted to avoid skidding.

It will be understood that while the hydraulically operated plural control mechanism previously described represents the preferred embodiment of my invention, variations may be made without departing from the invention. Mechanically or vacuum operated mechanisms may be used, but the hydraulically operated mechanism affords many advantages over mechanically or vacuum operated mechanisms.

Having thus described the invention, what I claim as new and desire to secure by Letters Patent of the United States is:

1. In an automobile, the combination of, an engine, means for accelerating said engine, a braking system and means associated with the braking system and the acceleration means for simultaneously and automatically in response to the braking pressure accelerating the engine a predetermined amount when the brakes are applied and while the engine is operatively connected to the wheels.

2. In an automobile, the combination of, an engine, means for accelerating said engine, a clutch mechanism adapted to engage and disengage the engine in driving the automobile, a braking system, means associated with the braking system and the acceleration means for simultaneously and automatically accelerating the engine a predetermined amount when the brakes are applied, and means associated with said means and with the clutch mechanism for decelerating the engine when the clutch is disengaged after the engine has been accelerated a predetermined amount and while the brakes are still applied.

3. In an automobile, the combination of, an engine, means for accelerating said engine, a hydraulic braking system and means associated with the braking system and the acceleration means for simultaneously and automatically accelerating the engine an amount increasing in proportion to the pressure applied to the brakes up to a predetermined amount at which point the brakes are fully applied.

4. In an automobile, the combination of, an engine, a clutch mechanism adapted to engage and disengage the engine in driving the automobile, a hydraulic braking system, means associated with the braking system and the acceleration means for simultaneously and automatically accelerating the engine a predetermined amount when the brakes are applied, and means associated with said means and with the clutch mechanism for decelerating the engine when the clutch is disengaged after the engine has been accelerated a predetermined amount and while the brakes are still applied.

5. In an automobile, the combination of, an engine, means for accelerating said engine, a hydraulic braking system including fluid pressure means adapted to operate the brakes, and means associated with the braking system and the acceleration means for simultaneously and automatically accelerating the engine a predetermined amount when the brakes are applied, said means including fluid pressure means associated with the fluid pressure means of the hydraulic braking system, a piston operated by said fluid pressure means when the brakes are applied, means connecting said piston with the acceleration means and adapted to accelerate the engine a predetermined amount when the piston is moved by pressure from the fluid pressure means, and means for returning the acceleration means and piston to normal position when the fluid pressure means is released.

6. In an automobile, the combination of, an engine, means for accelerating said engine, a braking system and means for simultaneously and automatically accelerating the engine when the brakes are applied in proportion to the pressure applied to the brakes up to a predetermined amount of acceleration at which point the brakes are fully applied.

7. In an automobile, the combination of, an engine, means for accelerating said engine, an auxiliary accelerating mechanism adapted to accelerate the engine a predetermined amount when the brakes are applied and a manually operated means for connecting and disconnecting said auxiliary accelerating mechanism.

WILLIAM F. DORIOT.